United States Patent
Zhou et al.

(10) Patent No.: US 9,835,758 B2
(45) Date of Patent: Dec. 5, 2017

(54) METHOD FOR FILTERING FOR INTERPRETATION OF NEUTRON INDUCED GAMMA RAY MEASUREMENTS

(71) Applicant: Schlumberger Technology Corporation, Sugar Land, TX (US)

(72) Inventors: Tong Zhou, Sugar Land, TX (US); James A. Grau, Marshfield, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/920,495

(22) Filed: Oct. 22, 2015

(65) Prior Publication Data

US 2017/0115428 A1    Apr. 27, 2017

(51) Int. Cl.
*G01V 5/04* (2006.01)
*G01V 5/10* (2006.01)

(52) U.S. Cl.
CPC .............. *G01V 5/045* (2013.01); *G01V 5/101* (2013.01); *G01V 5/102* (2013.01)

(58) Field of Classification Search
CPC ......... G01V 2210/667; G01V 2210/70; G01V 5/045; G01V 5/102
See application file for complete search history.

(56) References Cited

U.S. PATENT DOCUMENTS

| | | | |
|---|---|---|---|
| 4,391,574 A | 7/1983 | Medel, Jr. et al. | |
| 5,608,215 A * | 3/1997 | Evans | G01V 5/101 250/254 |
| 2013/0166223 A1* | 6/2013 | Triplett | G21D 3/001 702/23 |

* cited by examiner

*Primary Examiner* — David Porta
*Assistant Examiner* — Faye Boosalis
(74) *Attorney, Agent, or Firm* — Michael Dae

(57) ABSTRACT

A method for analyzing a formation includes entering into a computer a number of detected gamma rays resulting from imparting neutrons into the formation. The detected gamma rays are characterized by energy levels thereof. A number of detected gamma rays in each energy level comprises a measured spectrum. In the computer, a non-Gaussian filter is applied to a reference spectrum to match the measured spectrum in shape. The filtered reference spectrum and measured spectrum are used to determine a fractional volume of at least one component of the formation.

20 Claims, 10 Drawing Sheets

METHOD FOR FILTERING FOR INTERPRETATION OF NEUTRON INDUCED GAMMA RAY MEASUREMENTS

CROSS-REFERENCE TO RELATED APPLICATIONS

Not Applicable.

STATEMENT REGARDING FEDERALLY SPONSORED RESEARCH OR DEVELOPMENT

Not applicable.

NAMES TO THE PARTIES TO A JOINT RESEARCH AGREEMENT

Not Applicable.

BACKGROUND

This disclosure is related to the field of neutron well logging measurements for determining petrophysical properties of subsurface formations traversed by a wellbore. More specifically, the disclosure relates to using spectral analysis of gamma rays induced by neutrons to determine one or more petrophysical parameters of such formations.

Neutron induced gamma ray spectroscopy has been used to determine mineral and fluid composition of earthen formations traversed by wellbores, among other uses. In some embodiments, a gamma ray detector may comprise a scintillation crystal made from materials such as thallium-doped sodium iodide, bismuth germinate, gadolinium oxyorthosilicate, among other materials. The scintillation crystal is optically coupled to a photomultiplier tube which generates a voltage pulse in response to a scintillation (flash of light) emitted by the scintillation crystal in response to detection of a gamma ray. The amplitude of the voltage pulse is generally related to the energy of the detected gamma ray. Output of the photomultiplier may be electrically coupled to a multichannel analyzer, which counts numbers of voltage pulses occurring within selected amplitude ranges, and thus numbers of gamma rays detected corresponding to energy level ranges. The numbers of gamma rays detected at various energy levels where such gamma rays are induced by neutrons imparted into the formation may be analyzed to evaluate the composition of the formations.

U.S. Pat. No. 4,394,574 issued to Grau et al. discloses principles of neutron-induced gamma ray spectroscopy techniques. The '574 patent provides a detailed flow chart of full spectral analysis, in which a filter technique is one of the steps. The filter technique disclosed in the '574 patent is used to account for the detector resolution degradation in a measured gamma ray spectrum in order to match standard gamma ray spectra. Filtering may be performed by convolution of the standard spectra with a Gaussian function. The standard deviation of the Gaussian function may be a function of gamma ray energy (i.e. spectrum channel). In this way, the resolution of the standard spectra is adjusted to better match the measured spectrum with a degraded resolution.

Many factors may cause the energy resolution of a measured spectrum to be worse than the resolution of standard spectra, such as a detector with worse intrinsic energy resolution and high operating temperature, among other factors. Energy resolution is not the only factor that may vary from one detector to another, or vary with respect to temperature. Recently, it has been discovered that the shape of a full energy peak (i.e., a localized maximum amplitude at a particular energy level) can deviate from a symmetric Gaussian shape to a skewed, non-Gaussian shape. Skew in energy peaks in a measured gamma ray energy spectrum can be caused by scintillation crystal non-uniformity including non-uniform light collection and scintillator dopant gradients, etc. The skewed, non-Gaussian shape of one or more energy peaks can also vary with respect to operating temperature.

Non-Gaussian energy distribution about one or more energy peaks has not previously presented a problem in spectral analysis of gamma rays because the intrinsic detector energy resolution of older types of scintillation detectors was insufficient to determine the exact shape of a full energy peak. Therefore, it was sufficient using older types of scintillation detectors to assume that any peak in the measured spectrum had a Gaussian shape. However, with newly-developed detector and signal acquisition technology, (see, Knoll, G. F., *Radiation Detection and Measurement*, John Wiley and Sons, Inc., Hoboken, N.J., 2010) the intrinsic detector energy resolution has been improved dramatically. The assumption of a Gaussian shape of measured energy peaks has been determined no longer to be accurate. Variations of the shape of measured energy peaks need to be taken into account for accurate spectral analysis. Failure to take into account the spectral differences caused by variations in skew of the energy distribution may lead to biases in the elemental yields extracted from the measured spectra and as a consequence biases in the computed elemental concentrations.

SUMMARY

One aspect of the disclosure relates to a method for analyzing a formation. A method according to this aspect includes entering into a computer a number of detected gamma rays resulting from imparting neutrons into the formation. The detected gamma rays are characterized by energy levels thereof. A number of detected gamma rays in each energy level comprises a measured spectrum. In the computer, a non-Gaussian filter is applied to a reference spectrum to match the measured spectrum in shape. The measured spectrum is then analyzed to determine a fractional volume of at least one component of the formation.

Other aspects and advantages will be apparent from the description and claims that follow.

BRIEF DESCRIPTION OF THE DRAWINGS

FIG. 13 shows the two spectra before matching. FIG. 14 shows the measured spectrum, the reference spectrum filtered by a Gaussian filter, and the reference spectrum filtered by both Gaussian and exponential filters.

DETAILED DESCRIPTION

Figure 1:
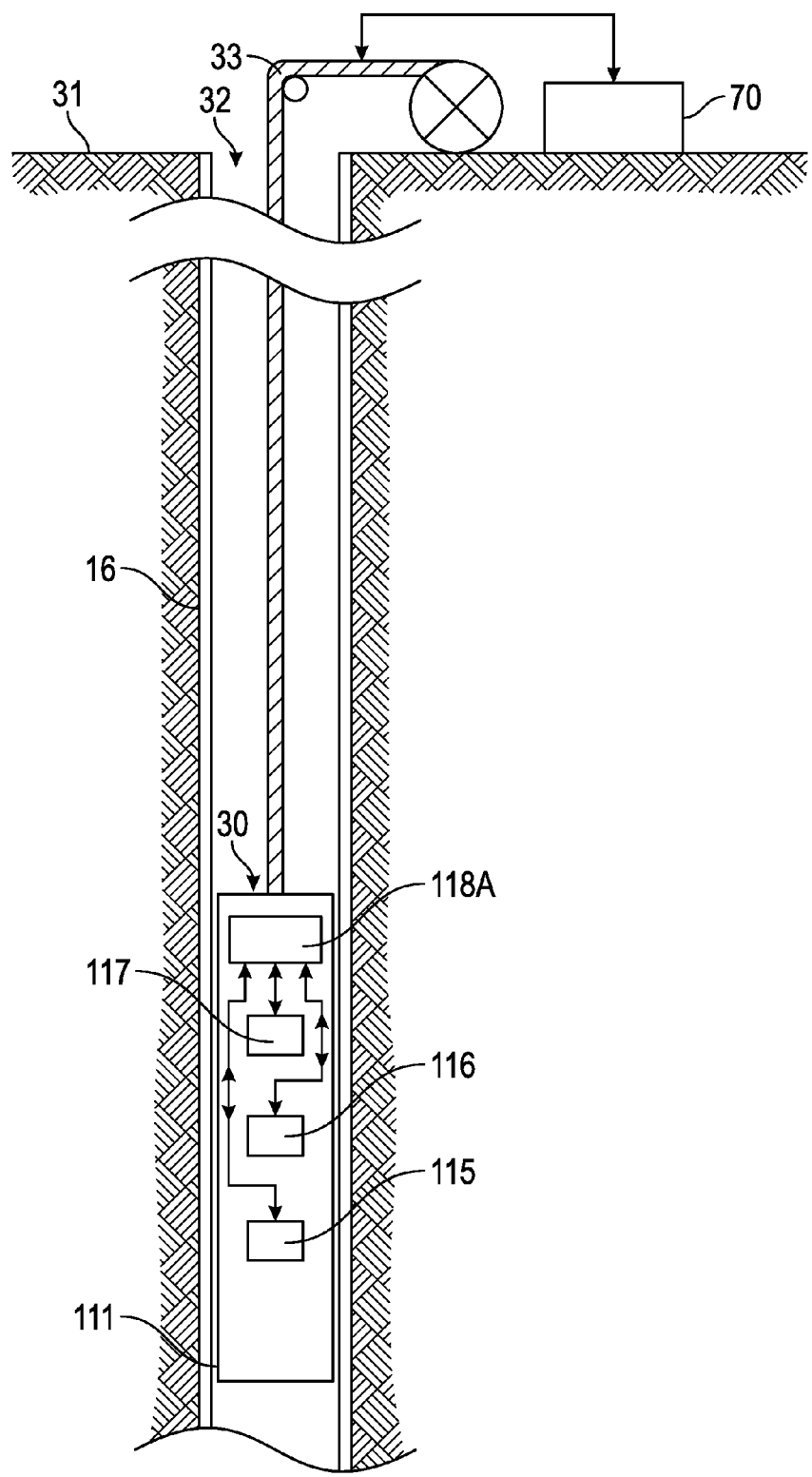
FIG. 1 shows an example well logging instrument conveyed through a wellbore by an electrical cable ("wireline").

FIG. 1 shows an example well logging instrument 30. The measurement components of the instrument 30 may be disposed in a housing 111 shaped and sealed to be moved along the interior of a wellbore 32. The instrument housing 111 may contain at least one energy source 115, e.g., a neutron source such as electrically operated pulsed neutron source ("source"), and one or more detectors 116, 117 each disposed at different axial spacings from the source 115. The source 115 may emit neutron radiation. Shielding (not shown) may be applied between the source 115 and the detectors 116, 117 to reduce direct transmission of neutrons from the source 115 to the detectors 116, 117. Thus, detected radiation may be characterized at each of a plurality of distances from the source 115, and thus have different lateral response (depth of investigation) into the formations surrounding the wellbore 32. In some examples, two or more different types of well logging instrument, each having a different type of source and different types of corresponding detectors may be included in the same instrument assembly of "tool string."

The instrument housing 111 maybe coupled to an armored electrical cable 33 that may be extended into and retracted from the wellbore 32. The wellbore 32 may or may not include metal pipe or casing 16 therein. The cable 33 conducts electrical power to operate the instrument 30 from a surface 31 deployed recording system 70, and signals from the detectors 116, 117 may be processed by suitable circuitry 118A for transmission along the cable 33 to the recording system 70. The recording system 70 may include a processor, computer or computer system as will be explained below with reference to FIG. 3 for analysis of the detected signals as well as devices for recording the signals communicated along the cable 33 from the instrument 30 with respect to depth and/or time. The circuitry 118A may include a multichannel analyzer (FIG. 4) for counting numbers of detected radiation events according to the energy of the detected events.

The well logging tool described above can also be used, for example, in logging-while-drilling ("LWD") equipment. As shown, for example, in FIG. 2, a platform and derrick 210 are positioned over a wellbore 212 that may be formed in the Earth by rotary drilling. A drill string 214 may be suspended within the borehole and may include a drill bit 216 attached thereto and rotated by a rotary table 218 (energized by means not shown) which engages a kelly 220 at the upper end of the drill string 214. The drill string 214 is typically suspended from a hook 222 attached to a traveling block (not shown). The kelly 220 may be connected to the hook 222 through a rotary swivel 224 which permits rotation of the drill string 214 relative to the hook 222. In some other embodiments, the drill string 214 and drill bit 216 may be rotated from the surface by a "top drive" type of drilling rig.

Drilling fluid or mud 226 is contained in a mud pit 228 adjacent to the derrick 210. A pump 230 pumps the drilling fluid 226 into the drill string 214 via a port in the swivel 224 to flow downward (as indicated by the flow arrow 232) through the center of the drill string 214. The drilling fluid exits the drill string via ports in the drill bit 216 and then circulates upward in the annular space between the outside of the drill string 214 and the wall of the wellbore 212, as indicated by the flow arrows 234. The drilling fluid 226 thereby lubricates the bit and carries formation cuttings to the surface of the earth. At the surface, the drilling fluid is returned to the mud pit 228 for recirculation. If desired, a directional drilling assembly (not shown) could also be employed.

A bottom hole assembly ("BHA") 236 may be mounted within the drill string 214, in some embodiments near the drill bit 216. The BHA 236 may include subassemblies for making measurements, processing and storing information and for communicating with the Earth's surface. Such measurements may correspond to those made using the instrument string explained above with reference to FIG. 1A. The bottom hole assembly is typically located within several drill collar lengths of the drill bit 216. In the illustrated BHA 236, a stabilizer collar section 238 is shown disposed immediately above the drill bit 216, followed in the upward direction by a drill collar section 240, another stabilizer collar section 242 and another drill collar section 244. This arrangement of drill collar sections and stabilizer collar sections is illustrative only, and other arrangements of components in any implementation of the BHA 236 may be used. The need for or desirability of the stabilizer collars will depend on drilling conditions as well as on the demands of the measurement.

Figure 2:
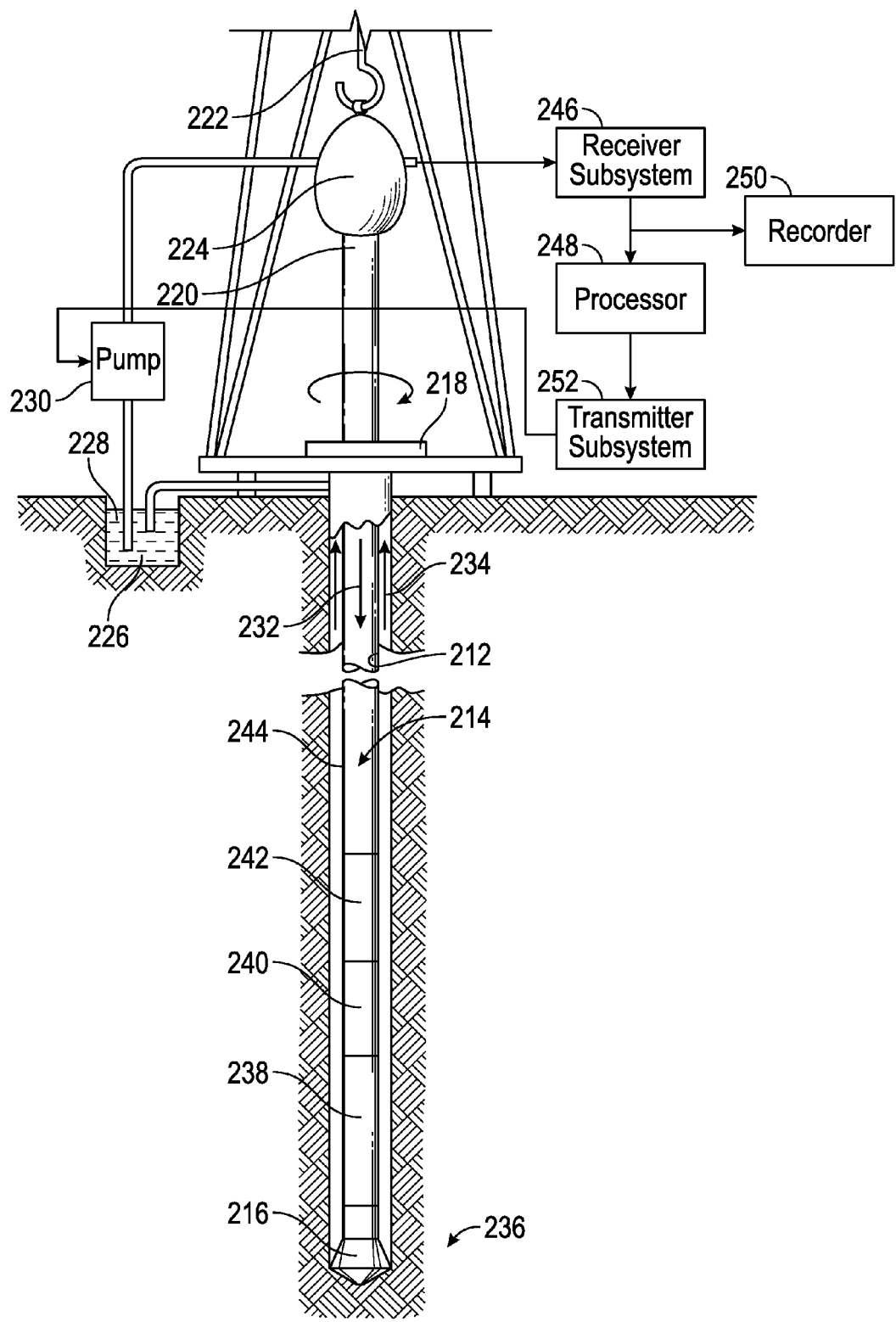
FIG. 2 shows an example logging while drilling instrument on a drill string.

In the arrangement shown in FIG. 2, the components of the well logging instrument may be located in the drill collar section 240 above the stabilizer collar 238. Such components could, if desired, be located closer to or farther from the drill bit 216, such as, for example, in either stabilizer collar section 238 or 242 or the drill collar section 244.

The BHA 236 may also include a telemetry subassembly (not shown) for data and control communication with the Earth's surface. Such telemetry subassembly may be of any suitable type, e.g., a mud pulse (pressure or acoustic) telemetry system, wired drill pipe, etc., which receives output signals from LWD measuring instruments in the BHA 236 (including the one or more radiation detectors) and transmits encoded signals representative of such outputs to the surface where the signals are detected, decoded in a receiver subsystem 246, and applied to a processor 248 and/or a recorder 250. The processor 248 may comprise, for example, a suitably programmed general or special purpose processor. A surface transmitter subsystem 252 may also be provided for establishing downward communication with the bottom hole assembly.

The BHA 236 can also include conventional acquisition and processing electronics (not shown) comprising a microprocessor system (with associated memory, clock and timing circuitry, and interface circuitry) capable of timing the operation of the accelerator and the data measuring sensors, storing data from the measuring sensors, processing the data and storing the results, and coupling any desired portion of the data to the telemetry components for transmission to the surface. The data may also be stored in the instrument and retrieved at the surface upon removal of the drill string. Power for the LWD instrumentation may be provided by battery or, as known in the art, by a turbine generator disposed in the BHA 236 and powered by the flow of drilling fluid. The LWD instrumentation may also include directional sensors (not shown separately) that make measurements of the geomagnetic orientation or geodetic orientation of the BHA 236 and the gravitational orientation of the BHA 236, both rotationally and axially.

The foregoing computations may be performed on a computer system such as one shown in the processor at 248 in FIG. 2, or in the surface unit 70 in FIG. 1. However, any computer or computers may be used to equal effect.

Figure 3:
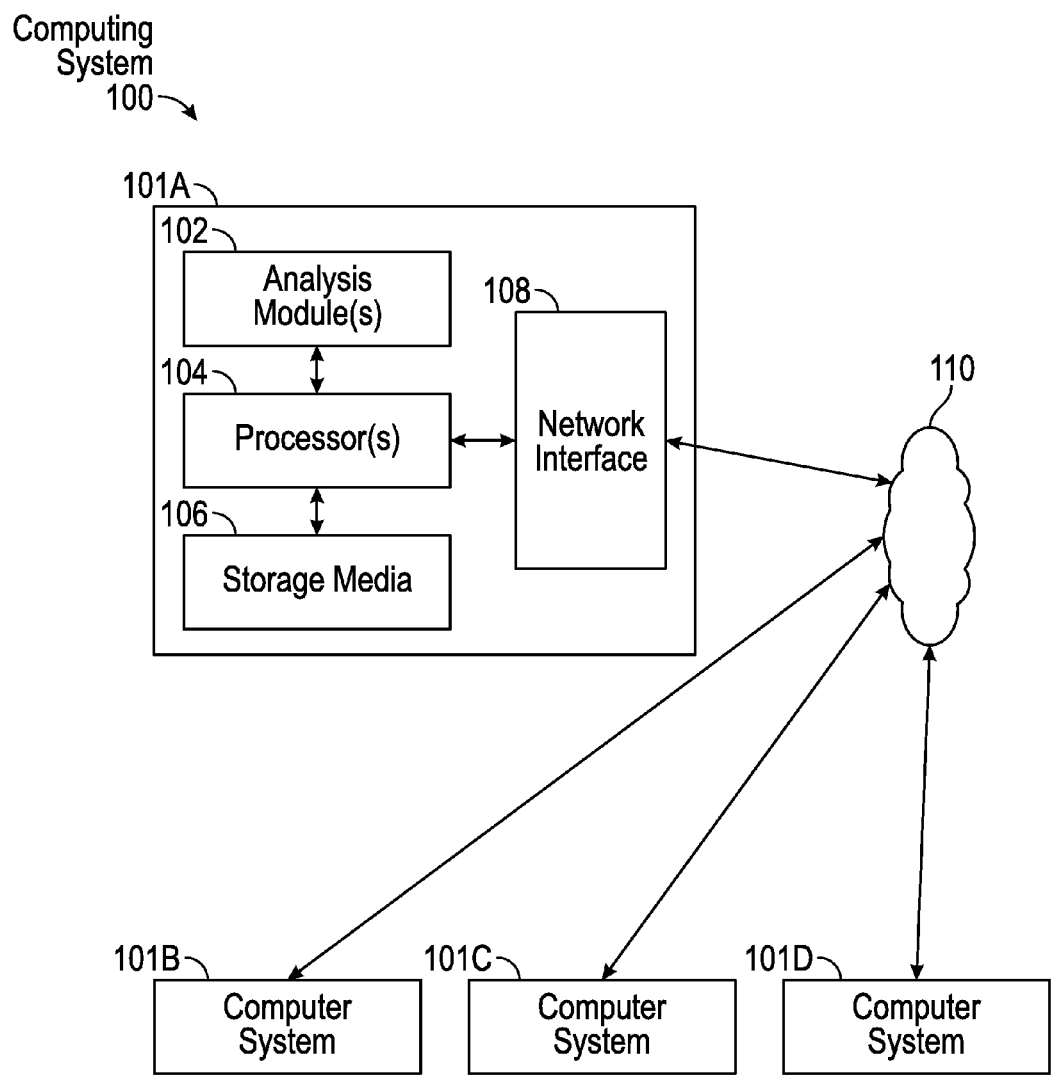
FIG. 3 shows an example computer system that may be used in some implementations.

FIG. 3 shows an example computing system 100 in accordance with some embodiments for carrying out example methods such as those to be explained below with reference to FIGS. 5 through 14. The computing system 100 can be an individual computer system 101A or an arrangement of distributed computer systems. The computer system 101A includes one or more analysis modules 102 that are configured to perform various tasks according to some embodiments, such as the tasks described above. To perform these various tasks, an analysis module 102 executes independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, in a well logging unit disposed proximate a wellbore drilling, while in communication with one or more computer systems such as 101C and/or 101D that are located in one or more data centers on shore, other ships, and/or located in varying countries on different continents). Any one or more of the computer systems may be disposed in the well logging instrument (whether wireline as in FIG. 1 or LWD as in FIG. 2).

A processor can include a microprocessor, microcontroller, processor module or subsystem, programmable integrated circuit, programmable gate array, digital signal processor (DSP), or another control or computing device.

The storage media 106 can be implemented as one or more non-transitory computer-readable or machine-readable storage media. Note that while in the embodiment of FIG. 3 storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 3, and/or computing system 100 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the methods described above may be implemented by running one or more functional modules in information processing apparatus such as general purpose processors or application specific chips, such as ASICs, FPGAs, PLDs, SOCs, or other appropriate devices. These modules, combinations of these modules, and/or their combination with general hardware are included within the scope of protection of the current disclosure.

Figure 4:
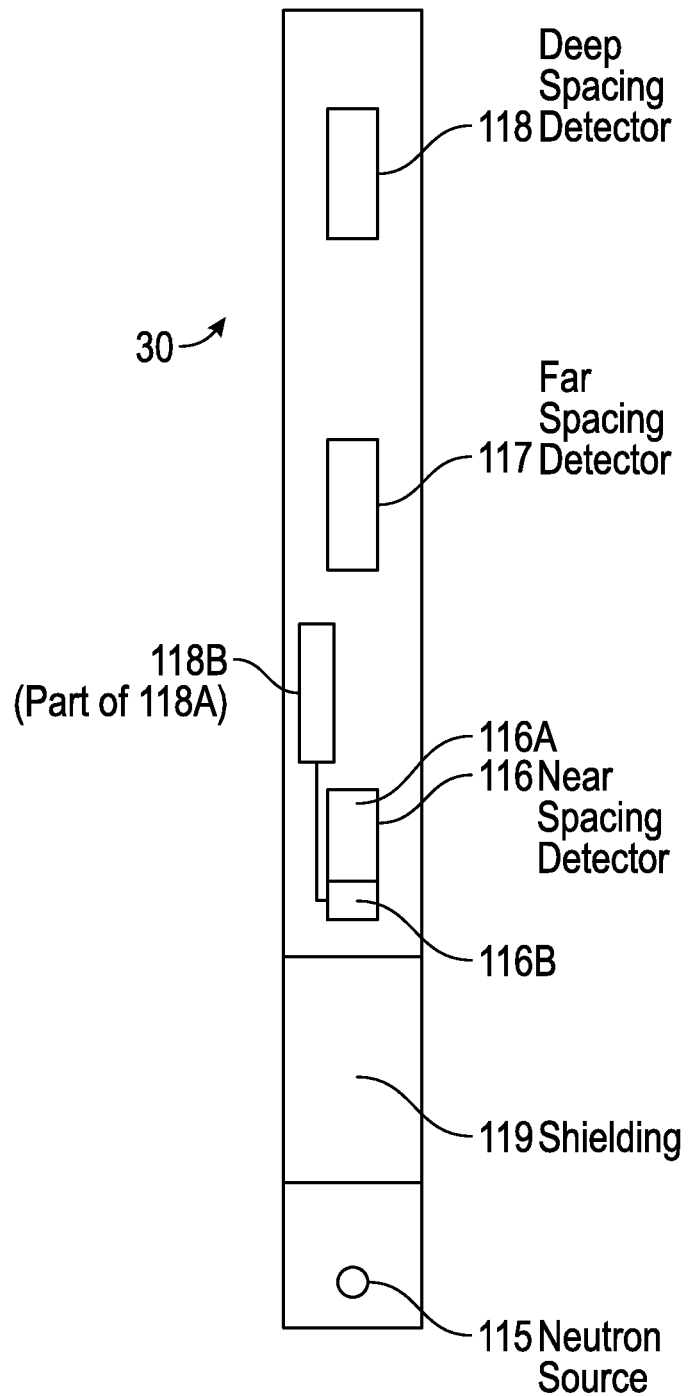
FIG. 4 shows a schematic representation of an example multi detector well logging instrument.

FIG. 4 shows a schematic cross section of an example neutron well logging instrument structure. Three detectors 116, 117, 118 at various longitudinal spacings from a neutron source 115 are indicated, but for some embodiments a single detector may suffice. The detectors 116, 117, 118 may be fast neutron detectors, thermal neutron detectors, epithermal neutron detectors, gamma ray detectors, or combinations thereof, as long as at least one of the detectors is a gamma ray detector having capability of making measurements related to the energy of the detected gamma rays. The foregoing may also include detectors which are sensitive to both neutrons and gamma rays, in which the neutron and gamma ray detection events can be distinguished. Shielding 119 between the source and the detectors reduces or prevents the direct passage of radiation from the neutron source to the detectors 116, 117 and 118. The neutron source 115 may be a radioisotope source, such as $^{241}$AmBe or $^{252}$Cf, or a pulsed neutron generator. The pulsed neutron generator may be based on the deuterium-tritium reaction (with source energy of 14.1 MeV, the deuterium-deuterium reaction (with a source energy of about 2.45 MeV) or any other suitable reaction. Methods according to the present disclosure can be applied to any form of neutron logging tools with the above described detector and/or neutron source options. In the example embodiment in FIG. 4, the near detector 116 may comprise a scintillation crystal 116A optically coupled to a photomultiplier 116B. Output of the photomultiplier 116B may be conducted to a multichannel analyzer 118B, which may form part of the circuitry (118A in FIG. 1). As explained above, gamma rays detected by the scintillation crystal 116A cause the photomultiplier 116B to emit voltage pulses corresponding in amplitude to the energy of the detected gamma rays. The multichannel analyzer 118B counts numbers of voltage pulses in each of a plurality of predetermined voltage channels, thus counting numbers of pulses corresponding to numbers of gamma rays detected having various energy levels. Within any predetermined time interval (e.g., one second or a fraction thereof), numbers of detected gamma rays with respect to energy level may be referred to as a "spectrum."

In methods according to the present disclosure a spectral filtering method may be used to account for non-Gaussian shape of energy peaks in measured spectra and differences among spectral peak shapes for different detectors and at different operating temperatures. Example embodiments of a spectral filter method may comprise applying an exponential filter to reference spectra (e.g., modeled spectra for a theoretically perfect detector) in order to match the reference spectra to non-Gaussian shapes of measured spectra, in addition to applying a Gaussian filter. A characteristic parameter λ in the exponential filter is a measure of skewness. The skewness is related to the gamma ray energy (i.e., the multichannel analyzer channel). λ may be parameterized as a function of analyzer channel number by using a mathematical formula, for example a polynomial expression. Some of the coefficients in such formulas are related to intrinsic detector properties, which can be calibrated. Other coefficients are related to operating temperature, which coefficients need to be determined in the spectral analysis.

In other embodiments, the exponential filter may be inversely applied to the measured spectra in order to match the shape of the measured spectra to the Gaussian shape of reference spectra. The exponential filter and the Gaussian filter may be applied separately to match both resolution and shape between the measured spectra and the reference spectra. It is also possible to combine the two filters into one, i.e., a skewed Gaussian filter, to filter the reference spectra in one process to match both resolution and shape to measured spectra.

Figure 5:
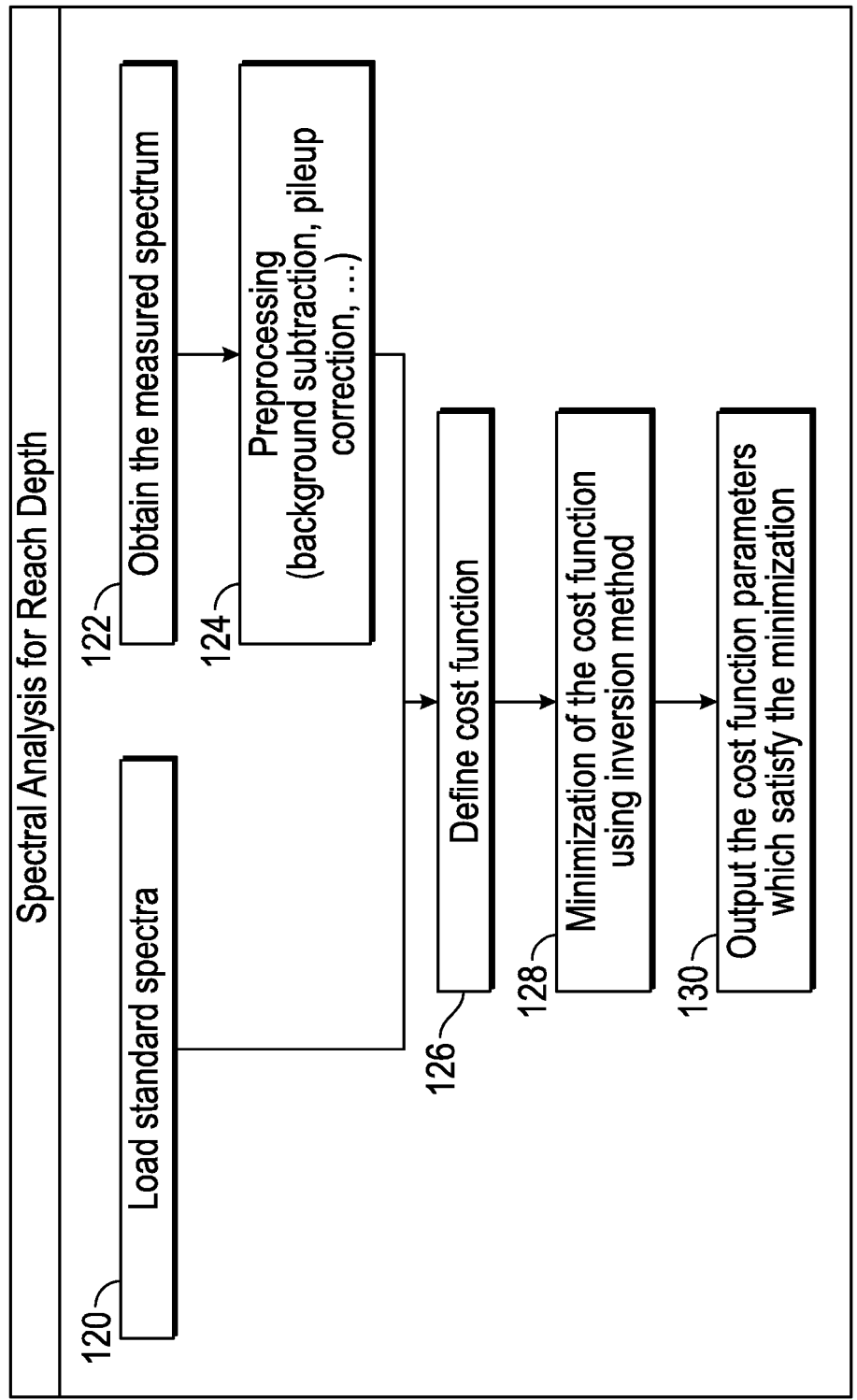
FIG. 5 shows a flow chart of an generic spectral analysis according to the present disclosure.

The basic spectral analysis may be understood with reference to the flowchart in FIG. 5, wherein inversion processing may be used to determine a minimum value of a cost function related to differences between measured gamma ray spectra and reference spectra. At 120, reference spectra may be input to a computer or computer system as explained with reference to FIG. 3. The computer or computer system may be in a surface recording unit as explained with reference to FIG. 1 or FIG. 2, or may form part of the instrument circuitry, e.g., as shown at 118A in FIG. 1. At 122, measured spectra are entered into the computer or computer system. The measured spectra may be determined from the number of counts in each multichannel analyzer channel, where each channel is interrogated at selected time intervals, e.g., one second or a fraction thereof. The measured spectra may be calculated in the instrument circuits, e.g., 118A in FIG. 1 or the analyzer channel count numbers may be communicated to the surface for evaluation in the surface recording system (FIG. 1 or FIG. 2) or other computer system (FIG. 3). At 124, the measured spectra may be corrected for detector response variables such as background radiation detection, pileup removal, etc. At 126, a cost function may be defined by differences between the reference spectra and the measured spectra. The cost function will be explained further with reference to FIGS. 6 and 7. At 128, values of input parameters which minimize the value of the cost function may be determined, e.g., using any known inversion technique. See, for example, D. L. B. Jupp and K. Vozoff, *Stable Interactive Methods for Inversion of Geophysical Data*, Geophysical Journal of the Royal Astronomical Society, Vol. 24, No. 3, pp. 957-976 (2011) as one non-limiting example. At 130, the values of the input parameters that result in a minimum value of the cost function may be output. Such parameters may include elemental yields determinable from the gamma ray spectra.

Figure 6:
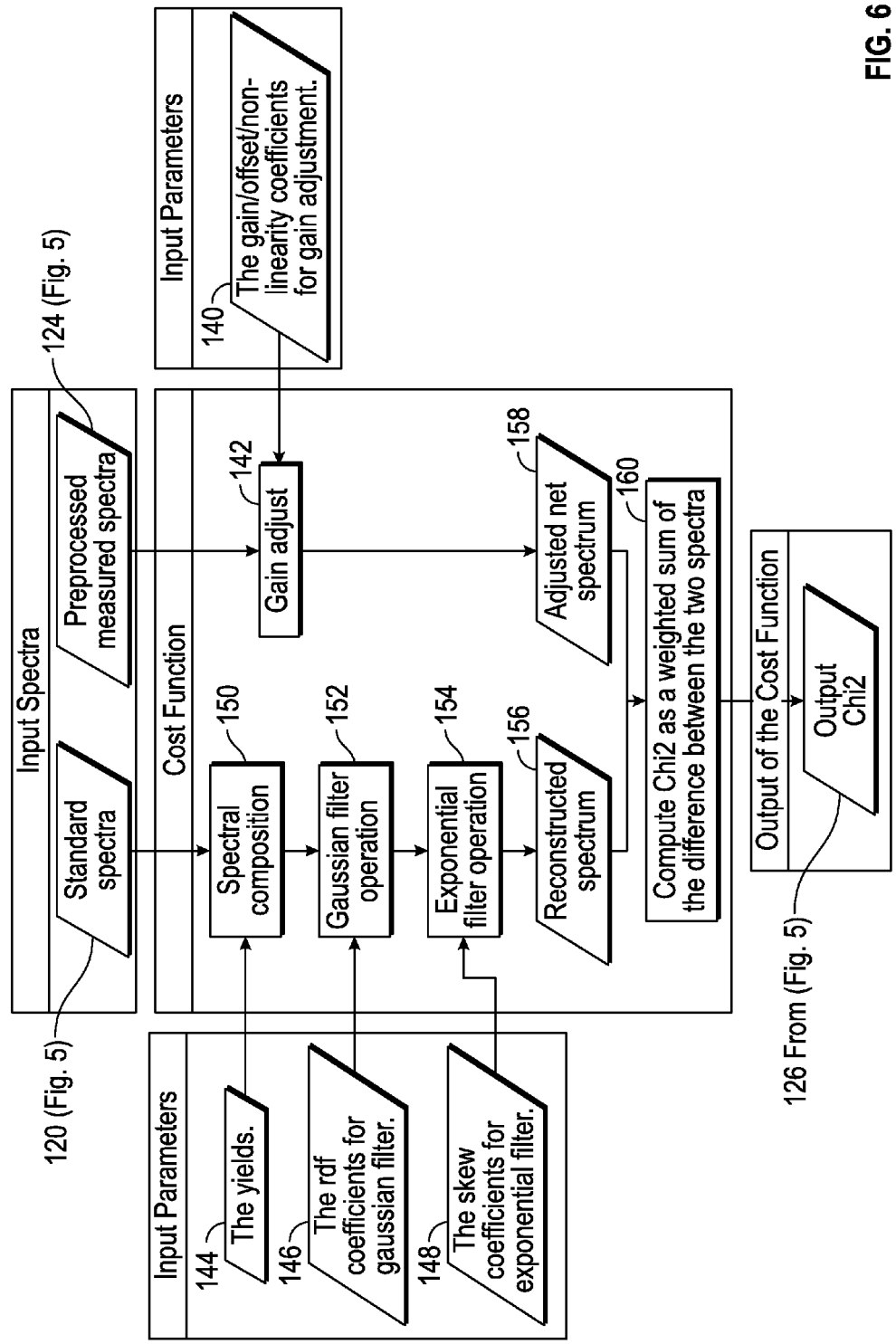
FIG. 6 shows a flow chart of an example embodiment of determining a cost function used in the spectral analysis.

On example embodiment of the cost function may be defined as shown in the flow chart in FIG. 6. At 120 and 124, reference and corrected measured spectra may be entered into the computer or computer system as explained with reference to FIG. 5. At 144, elemental yields may be entered into the computer or computer system to generate spectral composition at 150. At 146, coefficients of a Gaussian filter may be entered into the computer to enable Gaussian filtering the spectral composition, as shown at 152. At 148, coefficients for the non-Gaussian filter, e.g., an exponential filter may be entered into the computer. The Gaussian filtered spectral composition may be subsequently filtered by the non-Gaussian filter at 154 to generate at 156 a reconstructed spectrum. Contemporaneously, at 140, gain, offset and non-linearity parameters may be entered into the computer or computer system to perform a gain and adjustment calculation at 142 on the measured spectra. At 160 a value $\chi^2$ may be calculated as a weighted sum of differences between the filtered reference spectra and the adjusted measured spectra. Using inversion such as explained with reference to FIG. 5, the values of filter and elemental yield parameters that result in a lowest value of $\chi^2$ may be output at 126 to determine elemental yields and fraction volume of one or more components of a formation. By minimizing the cost function using any known inversion method, one may obtain a set of the cost function parameters which minimize the cost function. These parameters include elemental yields and the filter parameters (e.g., resolution degradation factor, skewness, gain, offset, non-linearity). The elemental yields are the final products that are useful for formation evaluation, while the filter parameters are used for adjusting the measured and the reference spectra to obtain a match between the two.

Figure 7:
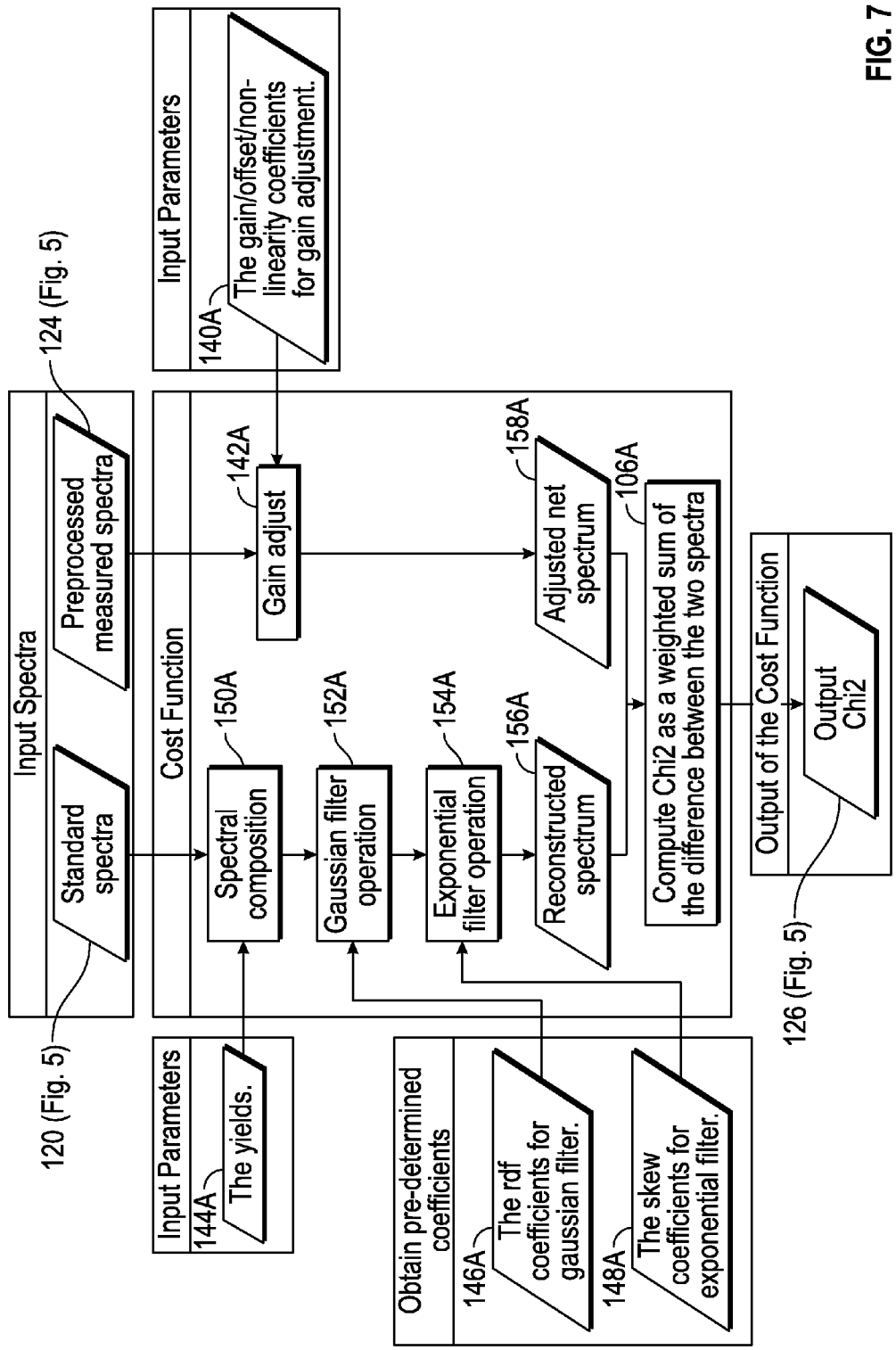
FIG. 7 shows a flow chart of another embodiment of determining a cost function.

Some of the filter parameters only vary slowly with respect to temperature or depth, therefore, they may be predetermined either based on a temperature measurement and calibration, or from previous spectral analysis with additional depth filtering. Thus, it is possible to reduce the number of parameters in the inversion in order to improve the precision of the elemental yields as the final products. The corresponding cost function in this case can be defined as shown in the flow chart in FIG. 7, wherein the input measured spectra and reference spectra are entered into the computer system as shown at 120 and 124, respectively. Actions corresponding to those in FIG. 6 are shown in FIG. 7 at 140A, 142A, 144A, 146A, 148A, 150A. 152A, 154A, 156A, 158A, 160A and 126, respectively.

Once the cost function is minimized, as shown in FIG. 5, the elemental yield may be used to determine a fractional volume of a formation of at least one component, e.g., a fractional volume of a specific chemical element.

Below are explanations of example embodiments of filtering method according to the present disclosure, and examples of Gaussian and exponential filters.

A spectrum may be represented as an N×1 vector: $\overline{Spec}_{N \times 1}$, where the total number of analyzer channels is represented by N. A Gaussian filter (Filter_G) using such notation is an N×N matrix:

$$\overline{Filter\_G}_{N \times N} = [g_{i,j}], i=1 \text{ to } N, j=1 \text{ to } N \quad (1)$$

and an exponential (Filter_E) filter is an N×N matrix:

$$\overline{Filter\_E}_{N \times N} = [e_{i,j}], i=1 \text{ to } N, j=1 \text{ to } N \quad (2)$$

Let $\phi(x, \mu, \sigma)$ denote the generic Gaussian distribution:

$$\phi(x, \mu, \sigma) = \frac{1}{\sigma \cdot \sqrt{2\pi}} e^{-\frac{(x-\mu)^2}{2\sigma^2}} \quad (3)$$

Then, the elements in the Gaussian filter matrix may be computed as:

$$g_{i,j} = \int_{j-1}^{j} \phi(j, i, \sigma(i)) = \int_{j-1}^{j} \frac{1}{\sigma(i) \cdot \sqrt{2\pi}} e^{-\frac{(j-i)^2}{2\sigma(i)^2}} \quad (4)$$

Where $\sigma(i)$ is a function of analyzer channel i. $\sigma$ can be parameterized as a function of analyzer channel i by the expression:

$$\sigma = \sqrt{rdf_1 \cdot i} \quad (5)$$

$$\text{or } \sigma = \sqrt{rdf_1 \cdot i + rdf_2 \cdot i^2} \quad (6)$$

The parameters rdf1 and rdf2 are tool and temperature dependent properties.

Let $\epsilon(x, \lambda)$ denote the generic exponential distribution:

$$\varepsilon(x, \lambda) = \begin{cases} \lambda \cdot e^{-\lambda x}, & x \geq 0 \\ 0, & x < 0 \end{cases} \quad (7)$$

Then, the elements in the exponential filter matrix can be computed as:

$$e_{i,j} = \int_{j-1}^{j} \varepsilon(j - i, \lambda(i)) \quad (8)$$

where $\lambda(i)$ is a function of analyzer channel i and $\lambda$ can be parameterized as a function of channel i:

$$\lambda = \frac{1}{\sqrt{skew_1 \cdot i}} \text{ or} \quad (9)$$

$$\lambda = \frac{1}{\sqrt{skew_1 \cdot i + skew_2 \cdot i^2}} \quad (10)$$

The parameters skew1 and skew2 are detector and temperature related properties.

The filtered spectrum (Spec_f) may be computed as a matrix product of the filter matrix and the spectrum vector (Spec):

$$\overline{Spec\_f} = Filter\_G \cdot \overline{Spec} \quad (11)$$

$$\overline{Spec\_f} = Filter\_E \cdot \overline{Spec} \quad (12)$$

One can apply multiple filters to a spectrum as follows:

$$\overline{Spec\_f} = Filter\_E \cdot Filter\_G \cdot \overline{Spec} \quad (13)$$

A combined skewed Gaussian filter can be computed in this case as:

$$Filter\_SG = Filter\_E \cdot Filter\_G \quad (14)$$

Figure 8:
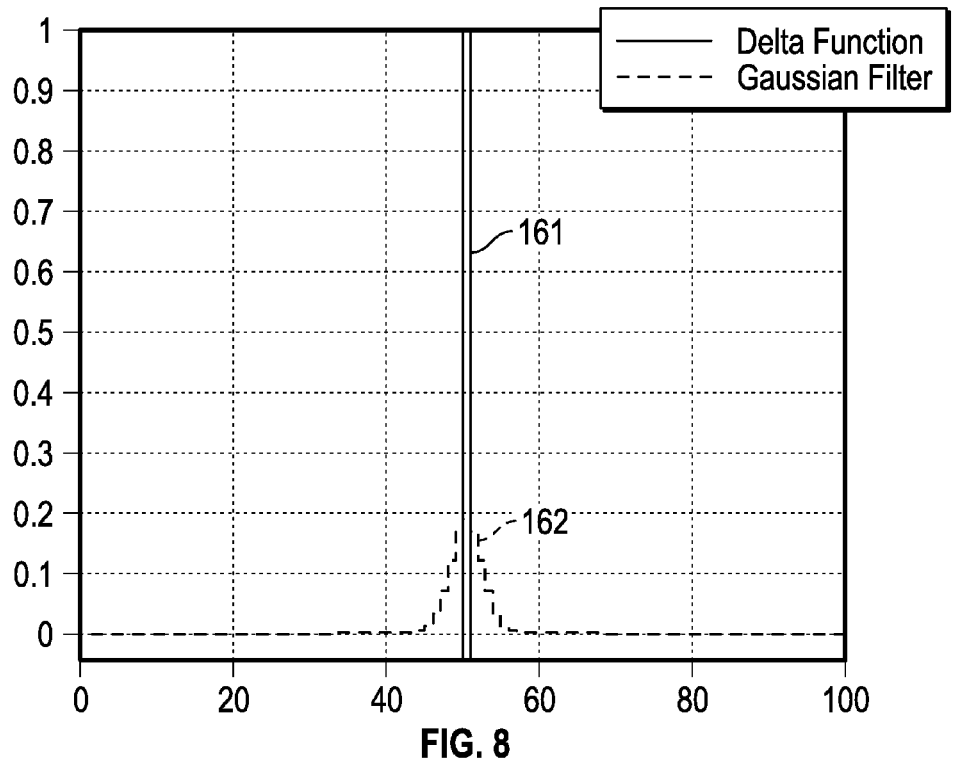
FIG. 8 shows a graph of a delta function and an example of a Gaussian filter.
Figure 9:
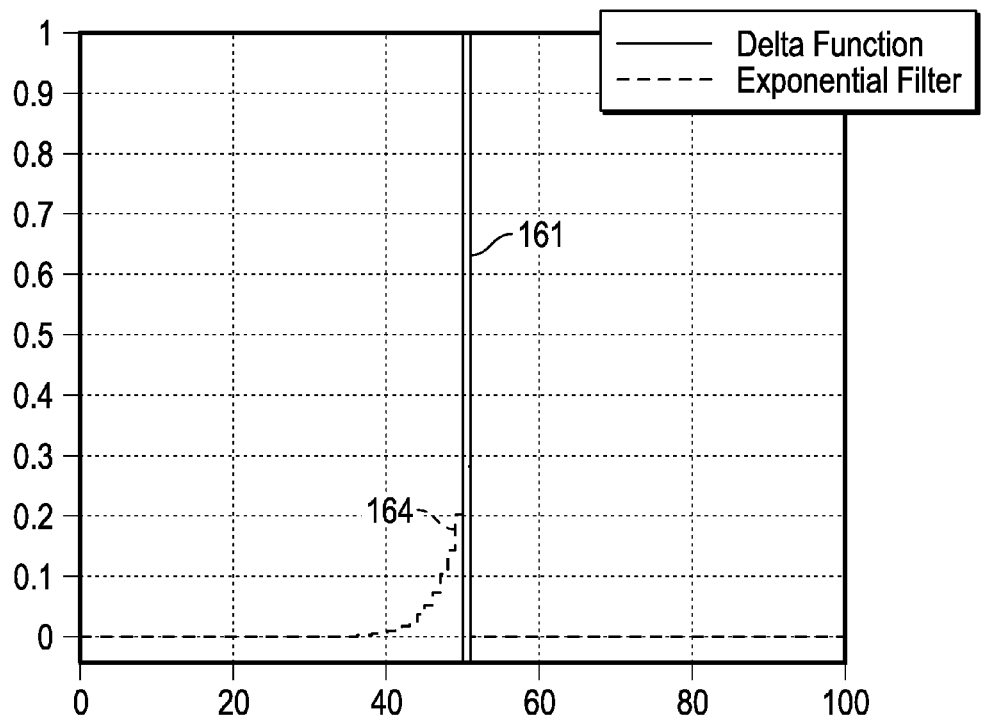
FIG. 9 shows a graph of a delta function and an example of an exponential filter.
Figure 10:
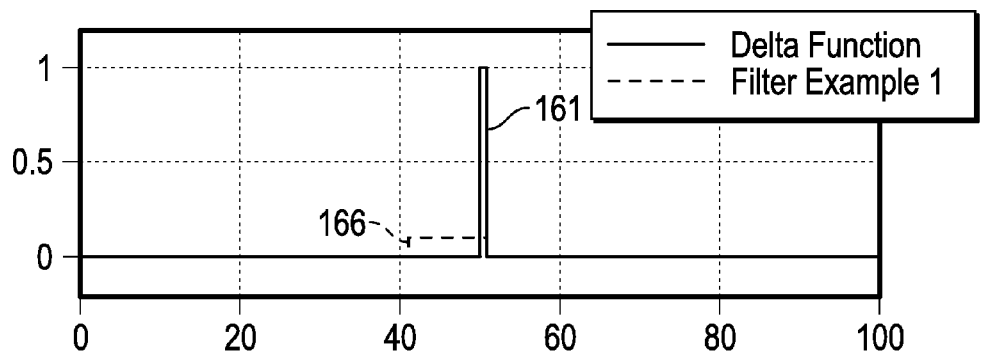
FIGS. 10 and 11 show to additional examples of delta function and filter examples with a similar function in each example as an exponential filter.
Figure 11:
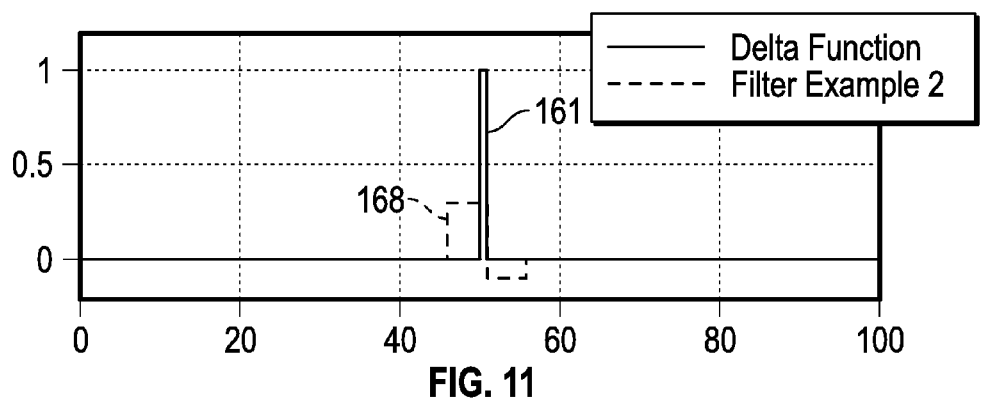

FIG. 8 shows an example of Gaussian filter at curve 162 and a delta function at curve 161. FIG. 9 shows an example of an exponential filter at curve 164 with the delta function at 161. The exponential filter may be described by a mathematical expression other than an exponential function. Basically, any filter that can redistribute counts from the current analyzer channel to lower analyzer channels (for skewed to left, or to higher channels for skewed to right) will perform the same function as an exponential filter. FIGS. 9-11 show several examples at curves 164, 166 and 168, respectively. A simple boxcar filter with only a left side may be used as shown at 166 in FIG. 10, or a positive boxcar on the left side and a negative boxcar on the right side as shown at curve 168 in FIG. 11.

Figure 12:
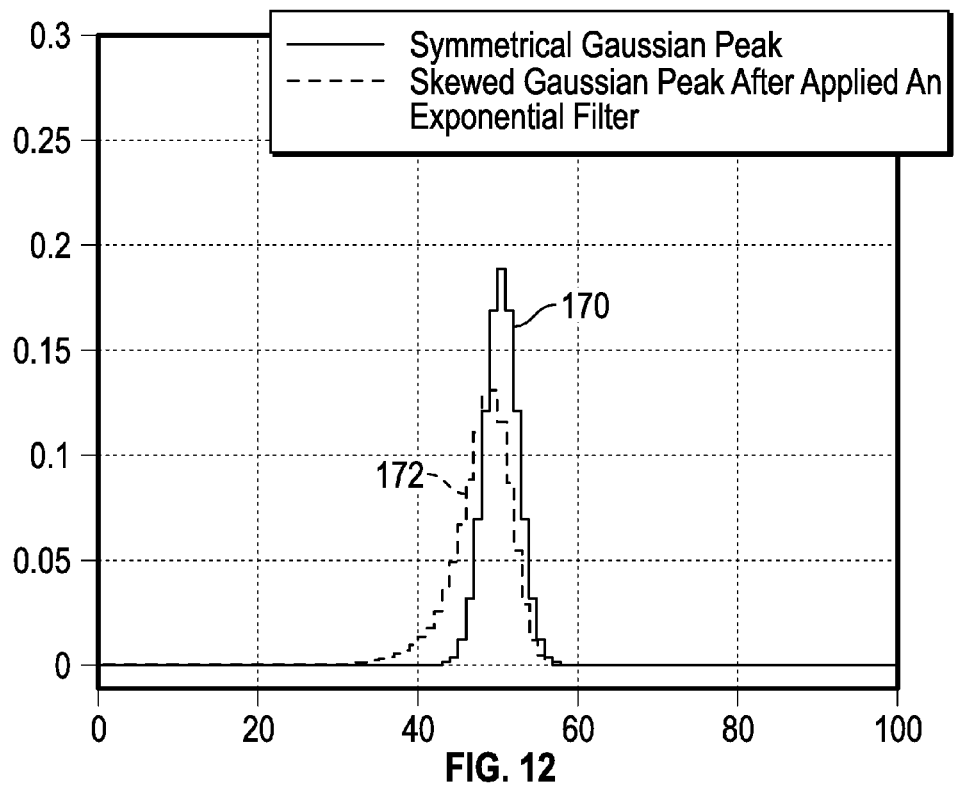
FIG. 12 shows a graph of a Gaussian peak, and a skewed Gaussian peak after applying an exponential filter.

FIG. 12 shows a skewed Gaussian filter at 172 compared with a normal Gaussian filter at 170. The skewed Gaussian filter 172 may be a skewed normal distribution, or an exponentially modified Gaussian distribution Many different options may be used to perform the foregoing skew to a Gaussian filter.

Figure 13:
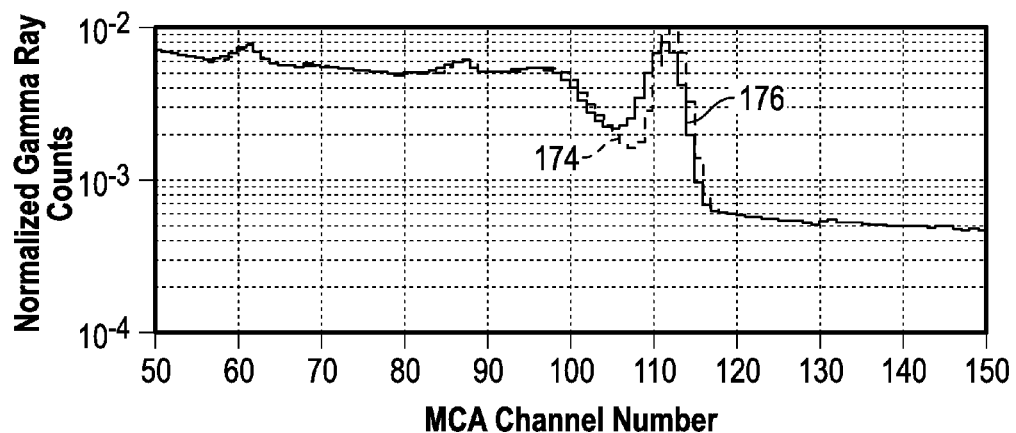
FIGS. 13 and 14 show an example of using filter techniques to match a measured spectrum to a reference spectrum which are measured by two different detectors with different detector response functions. Due to the different detector properties, the two spectra have different shape.
Figure 14:
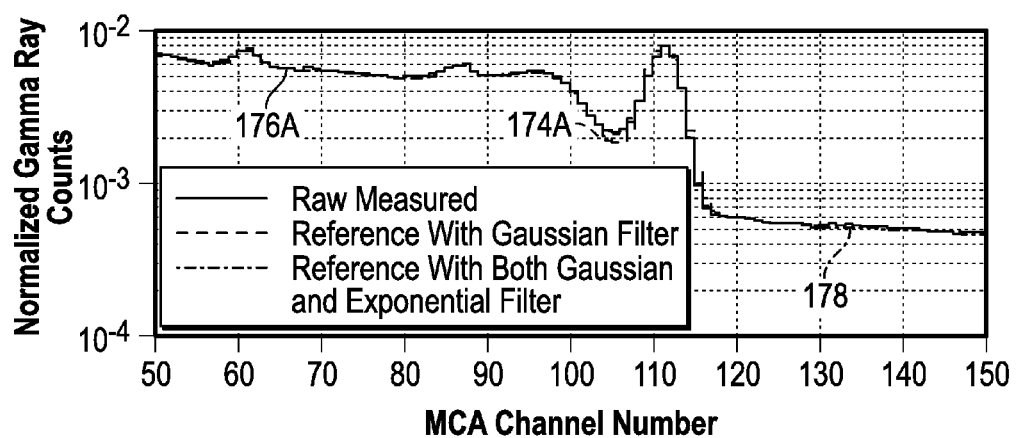

FIGS. 13 and 14 show two spectra measured by two sets of detectors with very different responses in the exact same conditions. One detector (reference) at curve 174 has a normal Gaussian peak shape, the other (measured) at curve 176 (FIG. 13) has an apparent worse spectral resolution and a skewed shape. It does not work very well by only applying a Gaussian filter to the reference to match the measured. However, after applying both Gaussian and exponential filters, the two spectra 174A, 176A in FIG. 14 can match each other very well as shown at curve 178 in FIG. 14. Thus, the approach described herein with an exponential filter technique can correct the illustrated detector-to-detector difference.

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for analyzing a formation, comprising:
   moving a pulsed neutron logging instrument in a wellbore penetrating the formation;
   imparting neutrons into the formation surrounding the wellbore;
   detecting gamma rays resulting from said imparting
   entering into a computer a number of detected gamma rays resulting from imparting neutrons into the formation, the detected gamma rays characterized by energy levels thereof wherein a number of detected gamma rays in each energy level comprises a measured spectrum;
   in the computer, applying a non-Gaussian filter to a reference spectrum to cause the measured spectrum to match the reference spectrum in shape; and
   in the computer, using the filtered spectrum and measured spectrum to determine a fractional volume of at least one component of the formation.

2. The method of claim 1 wherein the non-Gaussian filter comprises an exponential filter.

3. The method of claim 1 wherein the non-Gaussian filter comprises a boxcar filter.

4. The method of claim 1 further comprising in the computer applying a Gaussian filter to the reference spectrum.

5. The method of claim 4 wherein the non-Gaussian and Gaussian filters are applied in the computer in a single filtering process.

6. The method of claim 5 wherein filter parameters for the non-Gaussian filter and the Gaussian filter, and elemental yields of the reference spectrum are determined by minimizing a value of a cost function in the computer, the cost function related to differences between the Gaussian and non-Gaussian filtered reference spectrum and the measured spectrum.

7. The method of claim 5 wherein the filter parameters for the Gaussian spectrum comprise resolution degradation factor, skewness, gain, offset and non-linearity.

8. The method of claim 1 further comprising adjusting the measured spectrum for gain, offset and/or non-linearity in the computer to generate an adjusted measured spectrum.

9. The method of claim 1 further comprising moving a well logging instrument along an interior of a wellbore, imparting neutrons into formations surrounding the wellbore, detecting gamma rays from the formation and entering the detected gamma rays into the computer to generate the measured spectrum.

10. A system for analyzing a formation, comprising:
a neutron source;
a gamma ray detector;
an analyzer in signal communication with the radiation detector, the analyzer comprising counters for counting numbers of detected gamma rays corresponding to an energy level unique to each counter; and
a processor in signal communication with the analyzer and having input thereto at least one reference spectrum, the processor programmed to apply a non-Gaussian filter to the at least one standard spectrum to cause its shape to substantially match a measured spectrum determined from the counts in each channel of the analyzer, the processor programmed to generate as output at least a fractional volume of at least one component of the formation.

11. The system of claim 10 wherein the non-Gaussian filter comprises an exponential filter.

12. The system of claim 10 wherein the non-Gaussian filter comprises a boxcar filter.

13. The system of claim 10 further comprising in the computer applying a Gaussian filter to the reference spectrum.

14. The system of claim 13 wherein the processor is programmed to perform applying non-Gaussian and Gaussian filters in a single filtering process.

15. The system of claim 14 wherein the processor is programmed to calculate filter parameters for the non-Gaussian filter and the Gaussian filter, and elemental yields of the reference spectrum by minimizing a value of a cost function in the computer, the cost function related to differences between the Gaussian and non-Gaussian filtered reference spectrum and the measured spectrum.

16. The system of claim 15 wherein the filter parameters for the Gaussian spectrum comprise resolution degradation factor, skewness, gain, offset and non-linearity.

17. The system of claim 10 wherein the processor is programmed to adjust the measured spectrum for gain, offset and/or non-linearity to generate an adjusted measured spectrum.

18. The system of claim 10 wherein the neutron source comprises a pulsed neutron source.

19. The system of claim 10 wherein the neutron source comprises a chemical isotope.

20. The system of claim 10 wherein the neutron source, the gamma ray detector and the analyzer are disposed in a well logging instrument housing configured to move along an interior of a wellbore drilled through subsurface formations.

* * * * *